Nov. 4, 1930.  A. W. BEUTTELL  1,780,373
ILLUMINATING DEVICE
Filed Feb. 15, 1928
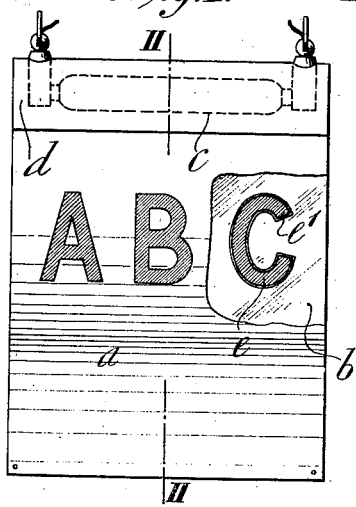
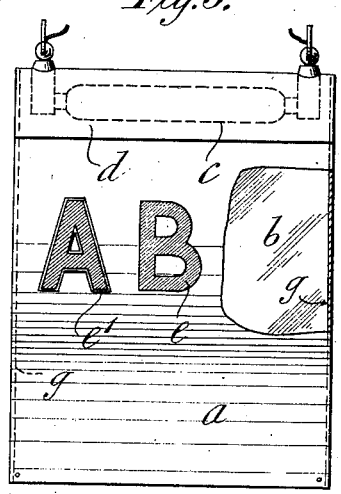
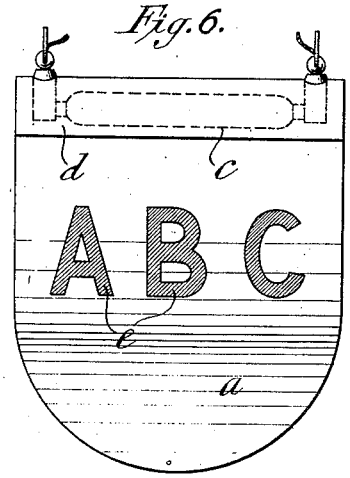
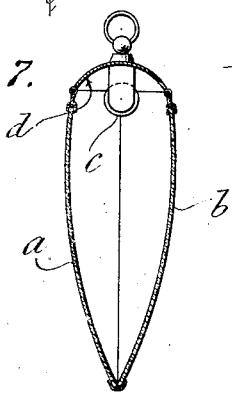
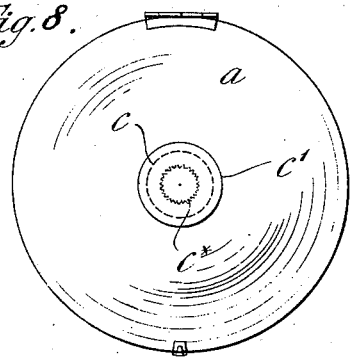
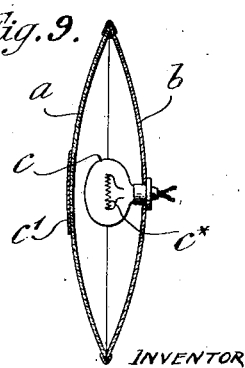
INVENTOR
Alfred William Beuttell
By Kiddle and Margeson
ATTORNEYS Patented Nov. 4, 1930

1,780,373

UNITED STATES PATENT OFFICE

ALFRED WILLIAM BEUTTELL, OF NORBURY, ENGLAND

ILLUMINATING DEVICE

Application filed February 15, 1928, Serial No. 254,472, and in Great Britain February 15, 1927.

The reflector window or windows may be employed to aid the illumination of an object or series of objects approximately in one plane, such being located in the best position to receive the illumination; or a reflector window may be arranged to form part of an enclosed or partly enclosed apparatus wherein, for example, an opaque surface, which may or may not have specular reflecting properties to assist in illumination, bearing an advertisement or other display, or acting as a background for objects constituting the display within the apparatus, forms one side of the apparatus and the reflector window forms the opposite side through which the display is viewed, whilst the source of light and suitable casing form another side of the apparatus.

Or, where two windows are employed, opposed to each other, the apparatus may constitute a transparent device containing an illuminated display, which may take the form of letters or other devices arranged on the interior surface of either or both windows, and/or of a separate display arranged or mounted within the apparatus.

The source of light may be daylight, or one or more electric lamps or other artificial light. The light-transmissive reflector may be adapted, as by a holder therefor, and with or without a lamp, to be readily fixed to a support carrying or constituting the object which is to be illuminated, in such manner as to form between the two a space that is of greater thickness at the part where the light from the source thereof enters it than at the part thereof that is remote from the source of light.

As will be obvious, apparatus embodying the invention can be variously constructed.

According to one construction, the apparatus comprises two members one at least of which constitutes a light-transmissive reflector, such as transparent clear glass, having a curved reflecting surface and inclined in relation to the other, and one or each of which is provided on its inner surface with the object which it is desired to display, provision being made for admitting light between the two surfaces. If artificial light is employed one or more electric lamps may be used as the light source arranged within a casing adapted substantially to conceal the source of light from front view, the arrangement being such that when the light source is in action, light will be caused to enter the space between the plates, from the thicker end of such space, and impinge angularly at a large angle of incidence against the opposed inner reflecting surfaces of the plates in such manner as to be reflected continually therefrom, within the said space, from one to the other so as to render luminous the object to be illuminated and render such object visible from the exterior of the apparatus, that portion of the object adjacent the light source or the point of entry of the light rays being mainly illuminated by direct rays, while the remainder is illuminated by direct and reflected rays. The reflecting surface of one or each of the plates is concave.

Instead of using one or more lamps as the source of light, the arrangement may be such that daylight is admitted to the space between the said two surfaces from the thicker end of the device to impinge against the two opposed inner surfaces in the manner set forth, the illumination of the object, however, so far as uniformity is concerned being similar to the results produced by artificial lighting as above described.

In the accompanying illustrative and more or less diagrammatic drawings, Fig. 1 is a front elevation and Fig. 2 a section on the line II—II of Fig. 1, showing one construction of apparatus according to the invention, a part of the front plate of the said apparatus being broken away to show letters on the rear plate. Fig. 3 is a similar view to Fig. 1 showing a modification. Figs. 4 and 5 show in cross section, other modified constructions of the apparatus. Fig. 6 shows in front elevation and Fig. 7 in cross section another modified construction, while Figs. 8 and 9 show respectively in front elevation and cross section, a still further modification.

In the example shown in Figs. 1 and 2, which shows a device to be viewed from the front side only, $a$ is a light-transmissive plate of clear glass for example, and constituting in such case a transparent reflector, while $b$ is a rear plate shown as also of glass. These plates are arranged near together and inclined at a small angle to one another, the inner reflecting surface of the light-transmissive reflector or plate $a$ being concave. $c$ is a cylindrical incandescent electric lamp arranged horizontally above the space provided by the divergence of the two plates and covered by a casing $d$, such that the lamp is concealed thereby from direct observation by a person standing in front of the device. The inner surface of the casing $d$ may advantageously be of a light reflecting nature, or a separate reflector may be mounted in the casing if desirable. The arrangement is such that light emitted by the lamp $c$ into the space between the two plates, and also light reflected from the under side of the casing $d$, if such side be of a reflecting nature, or from the separate reflector, as the case may be, will impinge angularly at a large angle of incidence against the inner reflecting surface of the reflector $a$ to be reflected thereby towards and upon the object $e$ to be illuminated which in this instance is carried by the plate $b$ to illuminate the same uniformly and so that such object will be visible from the front of the apparatus. The object to be illuminated may be formed of opaque material and have a light diffusing surface, for instance of white paint.

In the embodiment of my invention shown in Fig. 3 which is also designed to be viewed from the front side only, the reflectors $a$ and $b$ are of glass, reflector $a$ being clear glass, while the object to be illuminated is arranged on the inner side of the front plate $a$. In this case, the object $e$ should be of a light diffusing and translucent nature, and may be formed of suitably shaped pieces of material of the character mentioned, either white, or of any desired colour, applied to the inner surface of the plate $a$. Or portions of the inner surface of the plate may be ground or etched to form the object to be illuminated, such ground or etched portions being filled in and coloured, or not, as may be desired.

If desired the inner sides of both of the plates $a$ and $b$ may be provided with letters formed of the respective materials described, the letters on the front plate being of course arranged out of line with those on the back plate, so that both sets of letters can be viewed through the front plate.

Fig. 4 shows an arrangement similar to that shown in Figs. 1 and 2, or in Fig. 3, so far as plates $a$ and $b$ are concerned but in which the lamp $c$ is omitted so that the space between the plates $a$ and $b$ can receive daylight from above, either direct or through a cover $f$ consisting of a piece of clear glass or other reflecting or refracting surface.

The rear plate or side $b$ of the device may, as shown in Fig. 5, be constituted by a bill, poster, picture or facia, or other object to be illuminated and be faced by a front plate $a$ of clear glass concaved on its inner face and so arranged with respect to the side $b$ that light impinging at a large angle of incidence upon its inner side will be reflected on to the object to be illuminated.

The letters $e$ in each of the arrangements described may be suitably adapted, as by providing them with gilt margins, as indicated at $e^1$ in Figs. 1 and 3, to render them more visible by daylight.

The space or spaces between the plates may be open at the sides as in the example shown in Figs. 1 and 2, or in some cases the edge portions of the plates, or those edge portions not connected together by the casing of the device, may be separated by other glass plates $g$ (Fig. 3) that may also bear letters on their inner surfaces, or the said edge portions of the plates may be connected together by strips composed of metal acting as mirrors.

If desired, one or both of the plates may be formed of opal glass and the letters formed on the outside of the plate or plates, being that side of it or them from which the letters are to be viewed.

Apparatus embodying the invention can be constructed in various forms to suit requirement. For example, it may be of rectangular form, as in the examples hereinbefore described, or of part circular shape as seen in front elevation, as shown in Fig. 6, or in the form of a bi-valve, as seen in cross section, as shown in Fig. 7. Or the plates might be circular and dish shaped and provided, as shown in Figs. 8 and 9, with an electric lamp $c$ at the centre, which should be concealed from direct view, as by a disc $c^1$ of opaque or translucent material. In this case, the filament $c^2$ of the lamp $c$ is preferably arranged in circular form and in the plane dividing the two plates, as shown. Also, in some cases, the glass may be opal glass and the letters arranged on the outside thereof and the two side plates $a$ and $b$ instead of being formed of two separate plates suitably secured together, might be made in one piece of glass. In this case the glass may be opal glass and the letters arranged on the outside thereof. Also, apparatus such as hereinbefore described, except that shown in Fig. 4, may be inverted and adapted to be supported from below, or from above, or from one side thereof, and the lamp or lamps, instead of being at the upper part of the apparatus may be at the side or bottom of the apparatus. The latter arrangement may advantageously be adopted when the apparatus is to be supported on a base plate for use, for instance, on a counter or like support.

It will be seen from the foregoing that my invention provides an illuminating device for display purposes wherein a reflecting surface is so arranged with respect to a light source and an object to be illuminated that light rays from said light source will impinge upon the reflecting surface at such an angle or angles that the ulterior portion of the object, i. e., that portion of the object remote from the light source will be illuminated by reflected and direct rays, while the portion of the object adjacent the light source is mainly illuminated by direct rays. This arrangement increases the illumination of the ulterior portions of the object as compared with existing devices, and effects a more uniform and more brilliant illumination of the whole object than possible with apparatus of the prior art.

It is evident that various modifications may be made in the construction above described within the purview of this invention.

What I claim is:—

1. A device of the class described comprising a curved transparent reflector so curved and adapted to be arranged relatively to an object to be illuminated and which is to be viewed through the reflector as to permit of the entry of light rays between the said curved reflector and the object and to increase the illumination of the ulterior portion of the object by reflection from the curved portion of said reflector.

2. A device of the class described comprising in combination two cooperating members, one of which is a curved transparent reflector through which the object to be illuminated is viewed, said members being so disposed relatively to each other as to permit of the entry of light rays between them and so that one member is inclined with respect to the other, said transparent member being so curved and so disposed relatively to the object to be illuminated as to increase the illumination of the ulterior portion of the object by reflection from the curved portion of the reflector.

3. A device of the class described comprising in combination two spaced cooperating members, one of which is a transparent curved reflector, said members being so disposed relatively to each other that one member is inclined with respect to the other, an artificial light source so disposed relatively to said members that light rays from the light source will enter the space between said members, and said reflector being so curved that an object to be illuminated and to be viewed through the transparent member will have that portion nearest the light source illuminated mainly by direct rays from said light source, the remainder of the object being illuminated mainly by rays reflected from the curved portion of the reflector.

4. A device of the class described comprising two cooperating members, one of which is a transparent curved reflector, said members being so disposed relatively to each other that one member is inclined with respect to the other, said reflector being so curved and arranged with respect to an artificial light source that the illumination of an object to be viewed through the transparent member resulting from the combined direct and reflected rays will be substantially uniform.

5. A device of the class described comprising in combination an artificial light source, a transparent reflector cooperating therewith, said reflector being so curved and so arranged relatively to the light source and to an object to be illuminated and which is to be viewed through the reflector as to permit of the entry of light rays from said light source between the said curved reflector and the object and increase the illumination of the ulterior portion of the object by reflection from the curved portion of said reflector.

6. A device of the class described comprising a transparent reflector the reflecting surface of which is so curved and so arranged relatively to an object to be illuminated and which is to be viewed through the reflector that light rays entering between said surface and said object gradually increase the light reflected toward the object as the distance from the light source increases.

7. A device of the class described comprising a transparent reflector the reflecting surface of which is so cuved and so arranged relatively to an object to be illuminated and which is to be viewed through the reflector as to permit of the entry of light rays between said surface and said object and to function as a concentrating reflector to increase the distribution of light toward the object as the distance from the light source increases.

8. A device of the class described comprising an enclosure for a light source and an object to be illuminated, the front wall of said enclosure being transparent and having a curved reflecting inner surface, the side walls of said enclosure having reflecting surfaces, and a reflector so disposed relatively to the light source as to reflect rays therefrom toward the curved reflecting surface of the front wall of the enclosure and toward the rear wall of the enclosure, said front wall being so disposed relatively to the rear wall of the enclosure that rays of light impinging upon the reflecting surface of the front wall will be reflected to the rear wall and from thence outwardly through the transparent front wall.

9. A device of the class described comprising a transparent reflector the reflecting surface of which is so curved and so disposed relatively to an artificial source of light and an object to be illuminated and which is to be viewed through the reflector as to promote uniformity of illumination of the object.

10. A device of the class described comprising two members so arranged relatively to each other as to provide between them a light-receiving space adapted to be illuminated by the entry of light rays thereinto, at least one of said members being transparent and having a reflecting surface so curved and arranged relatively to the entering light rays as to promote the uniform illumination of said space and of an object in said space.

11. A device of the class described comprising a curved transparent reflecting front wall and a rear wall so relatively arranged as to converge and form a substantially wedge shaped light-receiving space between them, an artificial light source arranged to direct light into said space from the wide part thereof and on to said curved transparent reflecting front wall at large angles of incidence whereby a correspondingly large percentage of reflected light is concentrated toward the ulterior portions of the rear wall and an opaque screen in front of said artificial light source and adapted to conceal it from the observation of a person viewing the illuminated rear wall through the curved transparent reflecting front wall.

12. A device of the class described comprising a transparent reflector having an inner concave reflecting surface which is so curved and arranged relatively to an object to be illuminated and which is to be viewed through the reflector as to permit of the entry of light rays between the said curved reflecting surface and the object and increase the illumination of the ulterior portion of the object by reflection of light striking said curved reflecting surface at large angles of incidence.

13. A device comprising two members, one of which is transparent and has an inner curved reflecting surface which is so arranged relatively to said other member as to form a light-receiving space between them and so curved that the comparatively low reflection factor of those light rays striking the near portions of the reflecting surface at relatively small angles of incidence will be compensated for by the higher reflection factor of the rays falling upon the remote portions of the reflector at large angles of incidence to promote uniform illumination of an object located in the light receiving space.

Signed at London, England, this 31st day of January, 1928.

ALFRED WILLIAM BEUTTELL.